United States Patent [19]

Meyer

[11] 4,341,369
[45] Jul. 27, 1982

[54] EXPANDING GATE VALVE ASSEMBLY

[75] Inventor: Danny S. Meyer, Richmond, Tex.

[73] Assignee: ACF Industries, Incorporated, New York, N.Y.

[21] Appl. No.: 143,965

[22] Filed: Apr. 25, 1980

[51] Int. Cl.³ .............................................. F16K 25/00
[52] U.S. Cl. .................................... 251/168; 251/196
[58] Field of Search ....................... 251/167, 168, 196

[56] References Cited

U.S. PATENT DOCUMENTS 2,954,960  10/1960  Dunbar ............................... 251/196
4,189,127   2/1980  Constantino ..................... 251/167 X Primary Examiner—Harold W. Weakley
Attorney, Agent, or Firm—Stephen T. Belsheim; Marvin J. Marnock

[57] ABSTRACT

A gate valve (10) has an expanding gate assembly (34) for reciprocal movement transversely of the flow passage (16, 18). The expanding gate assembly (34) includes a gate element (68) and complementary segment (70) which expand away from each other when the gate assembly (34) is in either a fully open or closed position. A spring (92) is anchored to a side (87) of the gate element (68) and extends over and engages a pair of spaced apart lugs (88, 90) on the adjacent side (91) of the segment (70). The lugs (88, 90) are positioned so that the movement of the gate element (68) relative to the segment (70) from the fully collapsed position results in the spring (92) exerting at least seventy percent of its total force on the lug (88 or 90) that is leading with respect to the direction of relative movement of the segment (70).

3 Claims, 6 Drawing Figures

EXPANDING GATE VALVE ASSEMBLY

BACKGROUND OF THE INVENTION

The invention relates to gate valves, and in particular, to gate valves that have an expanded gate valve assembly positioned therein for reciprocal movement transversely of the flow passage.

Although structures that continuously urge together the gate element and segment of an expanding gate valve assembly have been used heretofore, persons have continually sought to develop and improve such structures. It is very important that the gate element and segment immediately reach their collapsed position upon the displacement of the gate valve assembly from its fully open or closed position, and that they remain collapsed at all times when the gate valve assembly is not in its fully open or closed position. If the gate element and segment do not collapse when they should, the gate valve assembly may bind upon the valve seats which can result in a high operating torque required to move the gate assembly between open and closed positions.

Thus, it is highly desirable to provide an improved expanding gate valve assembly wherein the gate element and segment immediately reach their collapsed position upon the displacement of the gate valve assembly from its fully open or closed position. It would also be highly desirable to provide an improved expanding gate valve assembly that maintains the gate element and segment in a collapsed position when the gate valve assembly is not in its fully open or closed position.

Heretofore expanding gate valve assemblies have utilized a spring anchored at the opposite ends thereof to the gate element and engaging a single centrally disposed lug on the segment to continuously urge the gate element and segment toward a fully collapsed condition. This continuous urging was done in two principal ways: first, by providing the necessary force to help collapse the gate element and segment when the gate valve assembly is initially displaced from either its fully open or closed positions; and second, by providing the necessary force to maintain the gate element and segment together once they have been collapsed. In the former, before successfully urging the gate element and segment into a collapsed position, the spring must overcome resistance associated with the collapse of the gate element and segment. The principal components of this resistance are the weight of the segment and the frictional resistance associated with the gate element and segment having to slide on each other.

In the above described arrangement, when the gate element and segment are expanded away from each other, the single lug is only slightly displaced in the direction of relative movement of the segment from a transverse axis passing through the apex of the gate element as is the direction of the spring force acting upon the single lug. The consequence of this is that the spring does not efficiently overcome the resistances associated with the collapse of the gate element and segment and stronger springs must be utilized than if the expanding gate valve assembly more efficiently utilized the spring.

Heretofore, expanding gate valve assemblies have also utilized a pair of springs anchored to the gate and in engagement with a pair of pins on the segment. See the U.S. Pat. No. 4,189,127 issued to Constantino on Feb. 19, 1980. However, in the arrangement shown in U.S. Pat. No. 4,189,127 opposing longitudinal forces are continuously exerted against one another. Thus, the collapse of the gate assembly from its expanded to collapsed positions is resisted by the spring remote from the end of the segment leading with respect to the travel of the segment relative to the gate. Due to the relatively slight movement of the gate relative to the segment, it would appear that the force exerted by the leading spring to continuously urge the gate and segment together is not that much greater than the force exerted by the remote spring to resist this continuous urging. Consequently, these springs constantly oppose one another so that the device of the U.S. Pat. No. 4,189,127 appears to provide a significant resistance to the immediate collapse of the gate and segment upon their displacement from an expanded position.

Thus, it is highly desirable to provide an improved expanding gate valve assembly that more efficiently utilizes the spring forces. It is also highly desirable to provide an improved expanding gate valve assembly that more easily overcomes the resistance associated with the collapse of the gate element and segment. It is also highly desirable to provide an improved expanding gate valve assembly wherein a weaker spring is utilized than in earlier single lug assemblies of similar size. It is also highly desirable to provide an improved expanding gate valve assembly that does not provide any significant inherent resistances to the collapse of the gate and segment from their expanded to their collapsed positions.

SUMMARY OF THE INVENTION

It is another object of the invention to provide an improved expanding gate valve assembly that functions to urge the gate element and segment immediately to the collapsed position upon the displacement of the gate valve assembly from its fully open or closed position.

It is another object of the invention to provide an improved expanding gate valve assembly that maintains the gate element and segment in a collapsed position when the expanding gate valve assembly is not in its fully open or closed position.

It is another object of the invention to provide an improved gate valve assembly that more easily overcomes the resistance associated with the collapse of the gate element and segment.

It is another object of the invention to provide an improved gate valve assembly that does not provide any significant inherent resistances to the collapse of the gate and segment from their expanded to their collapsed positions.

Finally, it is an object of the invention to provide an improved gate valve assembly wherein a weaker spring is utilized than in earlier assemblies of similar size.

The invention is a gate valve comprising a valve body which has a valve chamber therein and inlet and outlet flow passages communicating with the valve chamber. An expanding gate assembly which includes a gate element and segment is slidably mounted within the valve chamber for movement between open and closed positions of the expanding gate assembly. The gate element has a V-shaped recess in a face thereof and the segment has a complementary V-shaped face fitting with the V-shaped recess when the gate element and segment are in a fully collapsed position. A spring is secured to the gate element and a flexing assembly for engaging the spring is connected to the segment. The spring engages the flexing assembly whereby the spring continuously urges the gate element and segment toward a fully collapsed position. The flexing assembly includes a pair of spaced apart flexing surfaces, such as lugs, aligned with the direction of travel of the gate assembly and equally spaced from and disposed on opposite sides of the transverse axis passing through the apex of the V-shaped face. The movement of the gate element relative to the segment away from the fully collapsed position results in an increased force being exerted by the spring against the flexing surface or lug that is leading with respect to the direction of relative movement of the segment. The force exerted by the spring on the leading flexing surface is at least approximately seventy percent (70%) of the total force exerted by the spring on all the flexing lugs. This results in the gate element and segment being urged into a fully collapsed position wih a relatively strong force generated by the spring when the gate assembly is moving between open and closed positions.

BRIEF DESCRIPTION OF THE DRAWINGS

In the accompanying drawings, in which two of various possible embodiments of the invention are illustrated.

DETAILED DESCRIPTION OF A SPECIFIC EMBODIMENT

Figure 1:
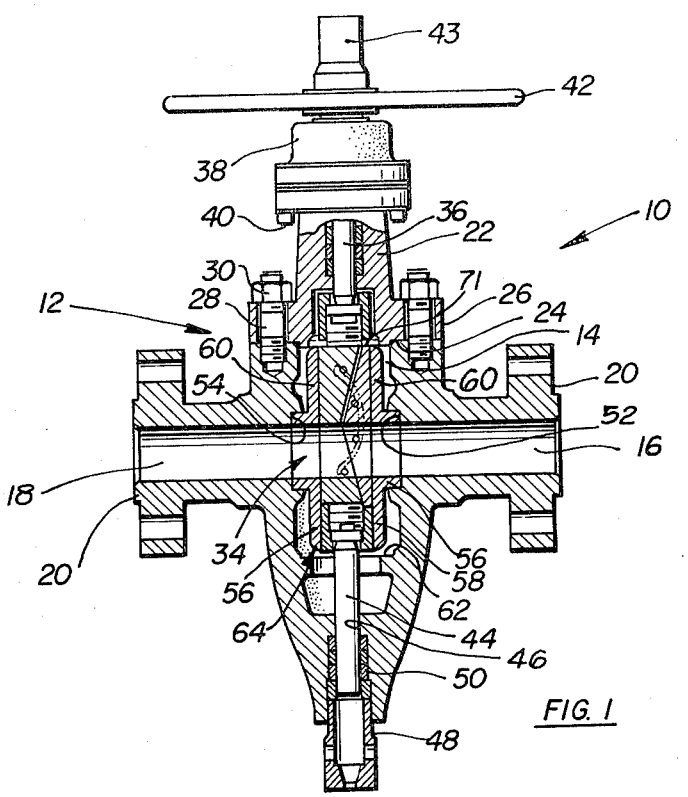
FIG. 1 is a sectional view, certain parts shown in elevation, of the gate valve structure embodying the present invention shown in the embodiment illustrated in FIGS. 2-4.

Referring now to the drawings for a better understanding of the invention, and more particularly to the embodiment of the invention shown in FIGS. 1-4, a gate valve structure generally designated 10 includes a valve body generally designated 12 having a valve chamber 14 therein. An inlet flow passage 16 and an outlet flow passage 18 communicate with valve chamber 14. A pair of flanges 20 on the ends of valve body 12 may be suitably connected to a pipeline or other flow system as is well known in the art. A bonnet 22, which has a lower circumferential surface 24 and a flange 26, is secured by suitable pairs of studs 28 and nuts 30 to the upper end of valve body 12.

An expanding gate valve assembly generally designated 34 is mounted within valve chamber 14 for reciprocal movement between open and closed positions relative to flow passages 16 and 18. An upper operating valve stem 36 is mounted for reciprocal movement relative to bonnet 22 by thrust bearings (not illustrated) mounted within a bearing housing 38. Bearing housing 38 is secured by studs 40 to the upper end of bonnet 22. A handwheel 42 is disposed at the upper end of upper operating valve stem 36 and is retained thereon by a stem cover 43. A more detailed description of the above described upper operating valve stem 36 and its connection to valve body 12 and expanding gate valve assembly 34 is contained in U.S. Pat. No. 3,893,652 issued to Natho on July 8, 1975, and the disclosure contained therein is hereby incorporated by reference into this application. It is understood that any one of a number of possible manual or power operator mechanisms may be provided to control the movement of upper operating valve stem 36.

A pilot or balancing stem 44 is mounted adjacent the lower end of gate assembly 34. The balancing stem 44 is received by an opening 46 in valve body 12 which communicates with valve chamber 14, and lower sleeve 48 is telescoped within opening 46. A packing 50 is disposed around balancing stem 44 adjacent the end of lower sleeve 48. Lower sleeve 48 may be suitably threaded within opening or bore 46 formed in valve body 12. Upper operating valve stem 36 and balancing stem 48 are of substantially the same cross-sectional area so that there remains in valve chamber 14 at all times the same proportional amount of stem which results in a generally hydraulically balanced valve assembly. Fluid pressure in valve chamber 14 above and below expanding gate valve assembly 34 is therefore equalized and expanding gate valve assembly 34 is balanced. It is understood that the illustration of balancing stem 44 is not intended to be limiting with regard to the scope of applicant's invention. The inclusion of balancing stem 44 and its accompanying structure is merely illustrative, and applicant's invention would operate no differently in a gate valve structure not having such a balancing stem 44 and its accompanying structure.

Formed in body 12 adjacent valve chamber 14 are a pair of annular recesses 52 and 54 which extend about respective flow passages 16 and 18. Identical seat elements 56 are pressed within annular recesses 52 and 54. Each seat element 56 includes respective lower and upper skirt portions 58 and 60 which have smooth inner faces in sliding contact with adjacent gate assembly 34. Upper skirt portion 60 is positioned closely adjacent circumferential surface 24 and lower skirt portion 58 is positioned closely adjacent an annular shoulder 62 formed in valve chamber 14. Upper operating valve stem 36 and balancing stem 44 are connected to gate assembly 30 as is well known in the art.

Figure 2:
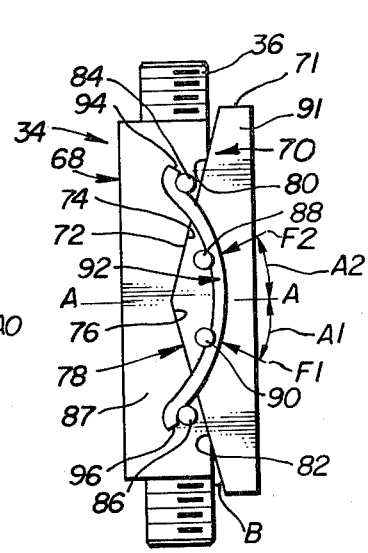
FIG. 2 is a side view of the gate assembly shown in FIG. 1 removed from the valve body with the gate element and segment in a fully collapsed condition.

Referring to FIG. 2, gate assembly 34 includes a gate element 68 and a complementary segment 70. Gate element 68 has a V-shaped recess 72 defining concave upper and lower surfaces 74 and 76 which intersect to form an apex 77. Segment 70 has a V-shaped face 78 defining convex upper and lower surfaces 80 and 82 which intersect to form an apex 83. V-shaped recess 72 and face 78 complement each other so that V-shaped face 78 fits within V-shaped recess 72 when gate element 68 and segment 70 are in a fully collapsed position.

The present invention is directed particularly to means for urging gate element 68 and segment 70 together toward a fully collapsed position. To accomplish this, a pair of retaining lugs 84 and 86 are generally aligned in a spaced relation in the direction of travel of gate assembly 34 and extend from a side 87 of gate element 68. A pair of spaced apart flexing lugs 88 and 90 which are also generally aligned in the direction of travel of the gate assembly 34 extend from a side 91 of segment 70. An elongate so-called ox bow spring 92 is anchored or secured at its opposite ends 94 and 96 to gate element 68. Ox bow spring 92 has an intermediate portion which is bowed outwardly from gate element 68 and engages lugs 88 and 90 on segment 70. Restraining lugs 84, 86 and flexing lugs 88, 90 are spaced apart from each other such a distance that spring 92 is sufficiently flexed to be continuously maintained in position.

FIG. 2 illustrates gate element 68 and segment 70 in a fully collapsed position wherein V-shaped face 78 of segment 70 is fitted within V-shaped recess 72 of gate element 68. When in the fully collapsed condition of FIG. 2, spring 92 acts with equal force on lugs 88 and 90 as indicated by spring force vectors F1 and F2 to maintain gate element 68 and segment 70 in their collapsed position. When in fully collapsed position, any frictional forces between gate valve assembly 34 and seat elements 56 are minimized during travel of the gate assembly between open and closed positions.

Whether the movement of expanding gate assembly 34 is such as to place gate valve 10 in a fully open or closed condition, the behavior of gate element 68 and segment 70 is generally similar except for the direction of movement. The description below relates to the upward movement of gate valve assembly 34 from a fully closed position to a fully opened position shown in FIG. 3.

Upon initial movement of gate assembly 34 from a fully closed position in which gate element 68 and segment 70 are expanded, segment 70 is urged to a collapsed position as shown in FIG. 2. This collapsed position is maintained during travel until the upper surface 71 of segment 70 engages the valve body as shown in FIG. 1 which acts as a stop. Further rotation of handwheel 42 expands segment 70 and gate element 68 to the fully open position shown in FIG. 3. The force exerted by upper valve stem 36 in moving gate element 68 overpowers that of spring 92, which urges gate element 68 and segment 70 toward a collapsed position, and consequently gate element 68 will move upwardly a slight distance relative to segment 70 after segment 70 has stopped out. This movement causes the lower surfaces 76 and 82 of the gate element 68 and segment 70, respectively, to slide or wedge relative to each other. This wedging action causes a lateral expansion between gate element 68 and segment 70, and the resultant gap 98 that forms between upper surfaces 74 and 80 of gate element 68 and segment 70, respectively. When gate valve assembly 34 is in the fully open position illustrated in FIG. 3, gate valve 10 is in a fully open condition and gate element 68 and segment 70 are in a fully expanded position whereby they press against seat element 56 creating a fluid-tight seal therebetween.

The force exerted by spring 92 is concentrated on the leading flexing lug associated with the relative movement of segment 70 relative to gate element 68. With respect to the specific embodiment illustrated by FIG. 3, retaining lugs 84 and 86, flexing lugs 88 and 90, and spring 92 are positioned such that spring 92 is lifted off the trailing flexing lug (upper flexing lug 88) resulting in all the spring force being concentrated on the leading flexing lug (lower flexing lug 90) when gate valve assembly 34 is expanded. Spring 92 does not exert any force that resists the collapse of the gate assembly; thus, spring force vector F4 equals zero.

Applicant's invention is not limited to the lifting of spring 92 off the trailing lug but encompasses those structures in which the spring still engages the trailing flexing lug when the gate assembly is expanded. However, the spring does not generate any significant force (represented by spring force vector F4) on the trailing flexing lug that opposes the collapse of the gate assembly. When the gate assembly is expanded, the least amount of spring force exerted on the leading flexing lug equals approximately seventy percent (70%) of the total spring force.

The actual amount of spring force exerted on the leading flexing lug can vary from approximately seventy percent (70%) to one hundred percent (100%) depending upon a number of factors. Some of these factors are the dimensioning and positions of parts, the size of the valve and the amount and location of wear on the valve.

An example of a specific embodiment is described below; however, it should be understood that this example is not intended to limit in any way the scope of applicant's invention.

Figure 3:
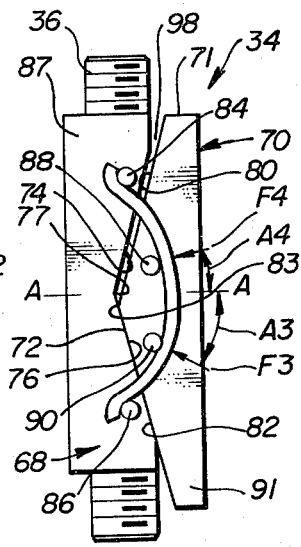
FIG. 3 is a side view of the gate assembly shown in FIG. 1 removed from the valve body with the gate element and segment in a fully open condition.

A model of a construction generally similar to that illustrated by FIGS. 1–3 was utilized with a 29/16 ths inch (6.51 cm) 20,000 psi expanding gate valve. The flexing and retaining lugs were spaced apart approximately 1.25 inches (3.18 cm) and approximately 6.06 inches (15.39 cm), respectively. The longitudinal axes passing through the retaining and flexing lugs were spaced apart approximately 1.58 inches (4.01 cm). The length of the spring between the points where it engages the flexing lugs was 2.40 inches (6.10 cm). The back angle of the gate and segment is eighteen degrees (18°). The contact angles of the forces acting on both flexing lugs when the gate and segment were collapsed were both three degrees (3°).

When the gate was moved relative to the segment a distance of approximately 0.069 inches (0.18 cm), the gate and segment expanded away from each other a distance equal to approximately 0.022 inches (0.06 cm), and approximately ninety percent (90%) of the total spring force was exerted on the leading flexing lug. The contact angle of the force exerted on the leading flexing lug was equal to approximately seven and one-half degrees (7½°).

The spring generated force necessary to successfully place gate element 68 and segment 70 in a collapsed position is equal to the weight of segment 70 multiplied by the "K" factor. The "K" factor is calculated pursuant to the formula set forth below. Thus, it is apparent that spring 92 can more easily urge gate element 68 and segment 70 toward their collapsed position when the "K" factor is lower.

The "K" value is calculated by the following formula:

$$K = \frac{(\cos B + u \sin B)}{\cos A \left[ (\cos B + u \sin B) \tan A + (\sin B - u \cos B) \right]}$$

wherein:

B is the back angle of gate element 68 and segment 70;

A is the contact angle associated with the leading lug on segment 70; and u is coefficient of friction associated with the sliding of the surfaces of V-shaped recess 72 and face 78.

Figure 1A:
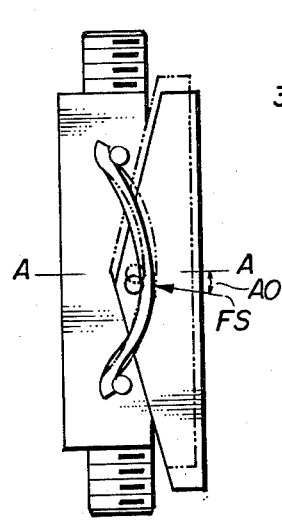
FIG. 1A is a side view of a prior art gate element and segment utilizing a so-called ox bow spring engaging a single lug on the segment.
Figures 4, 5:
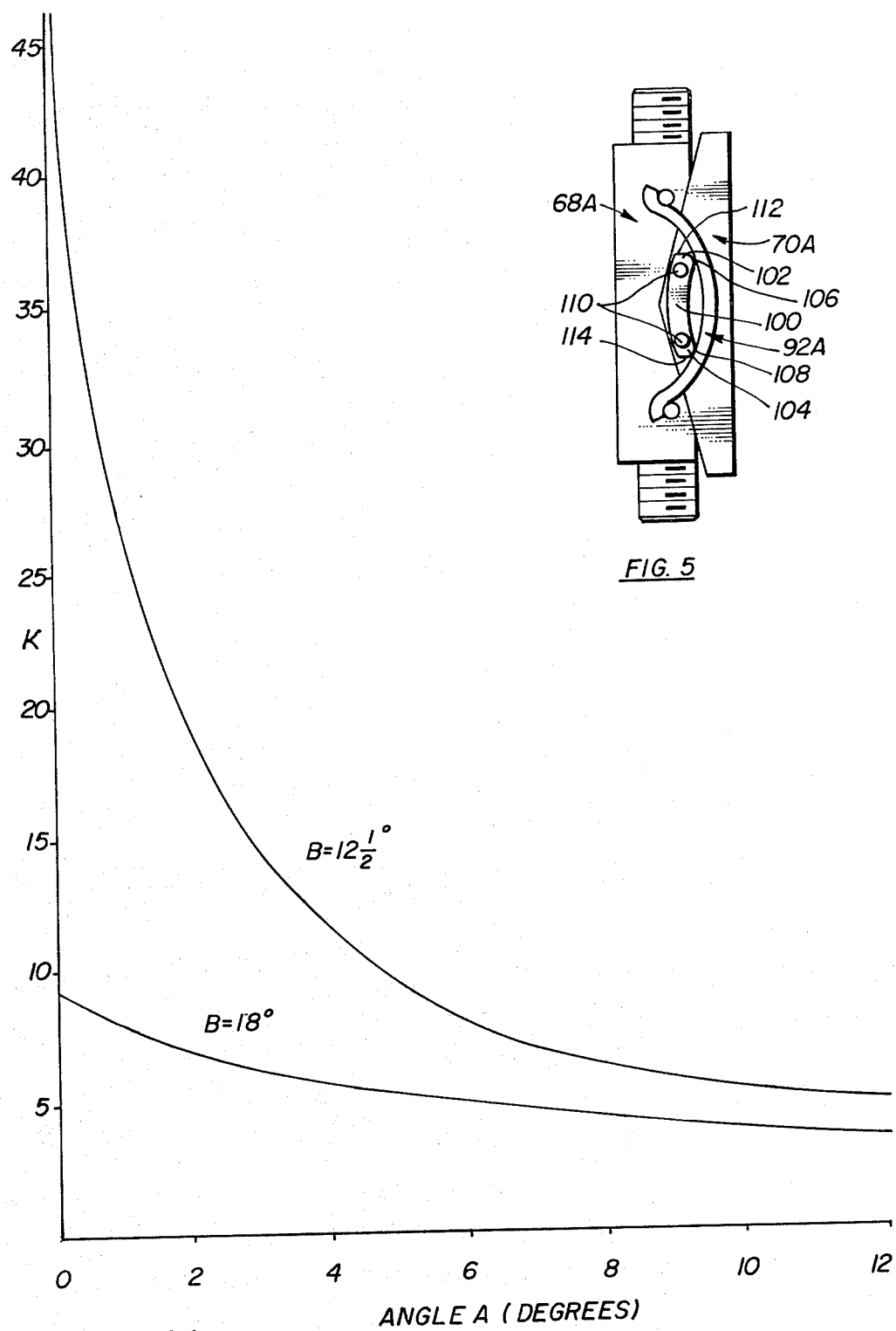
FIG. 4 is a graph illustrating the relationship between a factor ("K") indicative of the relative spring generated force necessary to collapse the gate element and segment and the angle at which the primary force exerted by the spring acts on the segment to urge it to the collapsed position for two degrees of angularity (12½° and 18°) of the interfitting faces of the segment and gate.
FIG. 5 is a side view of a modified flexing assembly for the gate element and segment shown in a fully collapsed condition.

It is apparent that the angle of displacement from axis A—A, or contact angle A, is greater for applicant's specific embodiment illustrated by FIGS. 2 and 3 than is that of the prior art structure illustrated by FIG. 1A. Applicant has found that the prior art structure, illustrated by FIG. 1A, has a contact angle AO not exceeding approximately one degree (1°). Referring to FIG. 4, the "K" factor for this kind of single lug (or flexing surface) arrangement is between approximately twenty-five (25) and approximately twenty-seven (27) for a back angle of 12½, and between approximately seven (7) and approximately eight (8) for a back angle of 18°. The most efficient use of spring 92 exists when the contact angle A3 is within the range from approximately four degrees (4°) to approximately ten degrees (10°). When the contact angle A3 is within this range, the "K" factor for applicant's structure is between approximately six (6) and approximately twelve (12) for a back angle of 12½°, and between approximately four (4) and approximately six (6) for a back angle of 18°. The magnitude of contact angle A3 may be selectively varied by varying the special relationships between all of lugs 84, 86, 88, and 90 relative to themselves and to spring 92. Generally, the use of applicant's structure has reduced the "K" factor anywhere from 33% to 65% in gate valve assemblies 34 having back angles between around 10° and around 18°. The advantages provided by applicant's invention are dramatically illustrated by FIG. 4.

FIG. 5 illustrates a modification of the present invention wherein a flexing plate 100 is secured to one side of segment 70A adjacent gate element 68A in place of the flexing lugs employed in the embodiment of FIGS. 1-4. Flexing plate 100 has a projection 102, 104 at each opposite and 112, 114 of plate 100. The projections 102 and 104 each have flexing surfaces and 106 and 108 which are alignment with the direction of travel of the gate valve assembly 34 and are in engagement with spring 92A. Flexing surfaces 106 and 108 are positioned similarly to flexing lugs 88, 90 in the embodiment of FIGS. 1-4 whereby they cause spring 92 to behave in a similar fashion. The remaining features of segment 70A and gate element 68A are identical to those of segment 70 and gate element 68 in the embodiment of FIGS. 1-4.

From the foregoing it is understood that applicant provides a gate valve having an expanding gate assembly with improved operation. Specifically, the gate assembly is designed so that the collapsing thereof is immediate upon the displacement thereof from either its fully open or closed positions thereby minimizing binding of the gate elements against the seat elements as heretofore has not always been the case due to the inability of the gate assembly to consistently overcome the resistances associated with the collapse of the gate element and segment. By providing a plurality of flexing surfaces that engage the spring, applicant more efficiently utilizes the spring force to overcome these resistances thereby allowing smaller and weaker springs to be utilized than in earlier apparatus of similar size. Applicant's apparatus concentrates the spring force at the proper point without generating any substantial inherent resistive forces so that the gate and segment are efficiently and continuously urged into their collapsed position by the spring.

What is claimed is:

1. In a gate valve structure having a valve body with a valve chamber therein and a flow passage extending through said valve body and communicating with said valve chamber, an expandable gate assembly mounted within said valve chamber for movement in a collapsed condition between open and closed positions with respect to said flow passage, said gate assembly including a gate element and a segment which are expanded away from each other at said open and closed positions and are provided with ports which are aligned with one another and the flow passage in said open position, said gate element having a pair of slide surfaces defining a V-shaped recess and said segment having a complementary V-shaped face defining an apex fitting in said V-shaped recess in conformity therewith when said gate element and segment are in a fully collapsed condition, said segment being slidably movable on either of said slide surfaces to effect the expansion or collapse of said gate assembly; an improved means for continuously urging said gate element and segment to a fully collapsed position, said means comprising:

a pair of spaced apart retaining lugs extending from a side of said gate element and aligned in the direction of movement of said gate assembly, said retaining lugs being equi-spaced from and disposed on opposite sides of a transverse axis passing through the apex of said V-shaped recess;

an elongate bowed spring;

a pair of spaced apart flexing lugs extending from a side of said segment and aligned in the direction of movement of said gate assembly and offset from the alignment of said retaining lugs, said flexing lugs being closer spaced than said retaining lugs and equi-spaced from and disposed on opposite sides of a transverse axis passing through the apex of said V-shaped face, said spring being disposed to be in tension on said sides of said segment and gate element with its opposite end portions adjacent its ends engaged by said respective retaining lugs on the sides of said retaining lugs remote from the apex of said V-shaped recess and its central bowed section engaged by both said flexing lugs when in the collapsed condition of said gate assembly and on the sides of said flexing lugs remote from the apex of said V-shaped face whereby said spring continuously urges said gate assembly to the fully collapsed condition and the movement of the gate assembly to the expanded condition associated with said open and closed positions results in said spring engaging and acting with flexing force on only that one of said flexing lugs which leads with respect to the direction of movement of said segment relative to said gate element.

2. The improvement of claim 1 wherein for a given back angle "B" of the V-shaped surfaces of said gate element and segment, the flexing lugs are offset from the retaining lugs and spaced from one another such that the bowed spring engages the flexing lugs in the expanded condition of the gate assembly at a contact angle "A" to provide the maximum force "F" necessary to achieve collapse of the gate assembly in accordance with the formula F=WK where $W$ = weight of the segment $$K = \frac{\cos B + u \sin B}{\cos A \, [(\cos B + u \sin B) \tan A + (\sin B - u \cos B)]}$$

and u is the coefficient of friction associated with the sliding engaged surfaces of the gate element and segment.

3. In a gate valve structure having a valve body with a valve chamber therein and a flow passage extending through said valve body and communicating with said valve chamber, an expandable gate assembly mounted within said valve chamber for movement in a collapsed condition between open and closed positions with respect to said flow passage, said gate assembly including a gate element and a segment which are expanded away from each other at said open and closed positions and are provided with ports which are aligned with one another and the flow passage in said open position, said gate element having a pair of slide surfaces defining a V-shaped recess and said segment having a complementary V-shaped face defining an apex fitting in said V-shaped recess in conformity therewith when said gate element and segment are in a fully collapsed condition, said segment being slidably movable on either of said slide surfaces to effect the expansion or collapse of said gate assembly; an improved means for urging said gate element and segment to a fully collapsed position, said means comprising:

a pair of spring assemblies affixed to opposite sides of the gate assembly and operative to continuously urge the gate element and segment of said gate assembly to a collapsed condition, each said spring assembly on one side of said opposite sides of said gate assembly including a pair of spaced apart retaining lugs extending from said one side of said gate element and aligned in the direction of movement of said gate assembly, said retaining lugs being equi-spaced from and disposed on opposite sides of a transverse axis passing through the apex of said V-shaped recess;

an elongate bowed spring;

a pair of spaced apart flexing lugs extending from a side of said segment and aligned in the direction of movement of said gate assembly and offset from the alignment of said retaining lugs, said flexing lugs being closer spaced than said retaining lugs and equi-spaced from and disposed on opposite sides of a transverse axis passing through the apex of said V-shaped face, said spring being disposed to be in flexed tension on said sides of said segment and gate element with its central bowed section engaged by both said flexing lugs when in the collapsed condition of said gate assembly on the sides of said flexing lugs remote from the apex of said V-shaped face and its opposite end portions engaged by said respective retaining lugs on the sides of said retaining lugs remote from the apex of said V-shaped recess whereby said spring is held against said one side of the gate assembly by said retaining and flexing lugs and continuously urges said gate assembly to the fully collapsed condition and in the expanded condition of the gate assembly acts on only the one flexing lug which leads with respect to the direction of movement of said segment relative to said gate element.

* * * * *